(12) United States Patent
Watanabe et al.

(10) Patent No.: US 6,185,729 B1
(45) Date of Patent: Feb. 6, 2001

(54) MULTIBYTE LOCALE FOR SINGLE BYTE LANGUAGES

(75) Inventors: Hiroshi Watanabe, Campbell; William A. Shannon, Los Altos, both of CA (US)

(73) Assignee: Sun Microsystems, Inc., Mountain View, CA (US)

( * ) Notice: Under 35 U.S.C. 154(b), the term of this patent shall be extended for 0 days.

(21) Appl. No.: 08/610,004

(22) Filed: Mar. 4, 1996

(51) Int. Cl.[7] .................................................. G06F 9/45
(52) U.S. Cl. ................................. 717/1; 717/4; 704/3
(58) Field of Search ................................. 395/701, 702, 395/703, 704, 705, 500, 500.47; 704/8; 703/27; 707/536; 717/1–5

(56) References Cited

U.S. PATENT DOCUMENTS

| | | | |
|---|---|---|---|
| 5,551,055 | * 8/1996 | Malheny et al. | 395/882 |
| 5,583,761 | * 12/1996 | Chou | 395/798 |
| 5,664,206 | * 9/1997 | Murow et al. | 704/8 |
| 5,754,858 | * 5/1998 | Broman et al. | 395/701 |

OTHER PUBLICATIONS

Kataoka et al., "A Model for Input and Output of Multilingual Text in a Windowing Environment", UIST '91, ACM, pp 175–183, 1991.*

Monisaki et al., "XTP System", UIST '91, ACM, pp 185–193, 1991.*

Tom Madell et al., "Developing and Localizing International Software", Prentis–Hall, pp. 1–11, 1994.*

Tom Madell et al., "Developing and Localizing International Software", published in 1994 by Prentis–Hall, Inc., of Englewood Cliffs, New Jersey, pp. 1–11.

Petzold, "Move over ASCII! Unicode is here", PC Magazine,. Oct. 1993, pp. 374.*

Van Camp, "Unicode and software globalization", Dr. Dobb's Journal, Mar. 1994, pp 46.*

* cited by examiner

*Primary Examiner*—Kakali Chaki
(74) *Attorney, Agent, or Firm*—McDermott, Will & Emery

(57) ABSTRACT

A development suite for developing and testing internationalized software includes, in addition to an ASCII English locale, a multibyte English locale. The presence of a multibyte English locale permits early discovery and correction of errors by English speaking developers which would otherwise only be found during localization of the software for a country where a multibyte representation was required. A system and a computer program product also utilize a multibyte English locale.

7 Claims, 8 Drawing Sheets

MULTIBYTE LOCALE FOR SINGLE BYTE LANGUAGES

BACKGROUND OF THE INVENTION

1. Field of the Invention

The invention relates to the development and testing of software to be deployed internationally and more particularly to the development and testing of software for languages requiring a multibyte representation for characters.

2. Description of Related Art

As computer hardware and software vendors expand their markets to Europe and the Far East, they are required to modify the related operating system and applications software to accommodate the language, customs and culture of the individual target markets. Many of these companies now achieve half of their total revenues from such markets.

The development and deployment of international software is discussed in a book entitled *Developing and Localizing International Software*, by Tom Madell et al. published in 1994 by Prentis-Hall, Inc., of Englewood Cliffs, N.J.

Much software is designed and programmed taking into consideration only the needs of users in the particular country where it is developed. As a result, other international users of the software are forced to struggle with the language of development and its corresponding cultural representations in order to use the software or, software designers or engineers must redesign and recompile the software to create a new version for each unique language and local environment that uses it.

An approach that enhances software for worldwide distribution uses internationalization and localization. Internationalization is sometimes referred to as I18N, for the eighteen letters between the I and the N in "internationalization," and is a process of configuring a program to make localization easy. Similarly, localization is sometimes referred to as L10N and generally involves more than merely converting languages of messages and displays.

Developers for a worldwide audience must enable computer systems to read and write in the user's native language, that is, to understand and display characters and symbols that may be far different from the characters set of a single byte language such as American English. Further, the computer systems must be enabled to have the capability to process the characters and text according to the rules of the user's language. Many languages have characters in excess of the twenty-six characters of the English language set. Software to be used internationally must provide flexibility to modify output conventions to comply with customary local requirements for representations of currency, numeric data or time. Such software should also provide the ability to allow for the translation of interfaces, messages and prompts without necessitating many different language versions of the underlying software.

I18N then, is the process of building in the capabilities which facilitate adaptation to different countries and locales during the development or modification process.

While I18N is usually a process performed during development of the code, localization, or L10N, is most often carried out subsequent to development, often in the foreign location where the software will be utilized. L10N is a process of actually adapting the potentially useful internationalized software to meet the needs of one or more users in a particular geographical area. It includes not only the translation of messages but also the selection or creation of appropriate language tables containing the relevant local data for use on a given system. Localization activities are usually performed by the software manufacturer or its representative in a particular locale.

Much software has been developed for use with terminals that generate 128 ASCII characters which can be represented by 7 bits of a single byte. Some other languages require 256 characters which require all 8 bits of a single byte. Such languages can be described as single byte languages. Some code sets for other languages, such as some Asian languages, contain thousands of characters and require more than a single byte. These can be described as multibyte languages.

Thus, localization must be possible for multibyte languages. This resulted in the development of worldwide portability interfaces (WPI) as defined by X/OPEN in standard XPG4. To internationalize a program, developers no longer deal with character data in a language-sensitive way; nor do they need knowledge of any foreign language. They do not even need to be aware of the ways different languages and code sets can vary. This makes the programming effort easier and provides for consistent treatment across languages.

A central concept of internationalization and localization is that a developer should be able to create a single internationalized application, which is capable of being extended into any number of localized programs without the need for redesign or recompilation.

To enable this, an internationalization model includes three parts. Namely, a language independent program, message catalogs and language tables. FIG. 1 illustrates a model of internationalized software. A language independent program 100 achieves language independence by programmatic calls to a message catalog 110 and to language table 120. Rather than hard-coding messages such as prompts and error messages within the program itself, such messages are stored in external message catalogs with a different version of those catalogs for each supported language. Language tables contain all language-specific processing information and conventions unique to a particular locale, such as how characters are sorted and how output (such as numbers, times and dates) is formatted. At run time, generally in a development environment the program selects or "binds" a specific language table according to settings controlled by the user, the application developer, or system administrator. Thus, the same basic program 100 can be executed in different language "locales" by simply binding the appropriate message catalog and language table to the program at run time. The term "locale" will be utilized to refer to the language table component of an internationalized application.

Use of the internationalization model of FIG. 1 provides several advantages. First, software does not need to be recoded in different versions for different languages in order to localize it. As a result, only one version needs to be updated and maintained as well as manufactured, stocked and shipped.

Because all language-dependent information is kept external to the program source, neither programmers nor translators need to modify the program source code in order to localize program language behavior. As a result, the possibility of introducing bugs into the main or core program during localization of the software is eliminated. Instead of having to work with a huge amount of source code, translators can work from a discrete message file containing only the text to translate. This frees them from the need to have programming skills.

Since software can be localized more easily and inexpensively, such software should become more readily available and, as a result, fewer end users will be forced to deal with difficult foreign language representations.

By using external language tables, the structural and processing rules of each language are consolidated into one physical location which can be modified to meet even more specific local requirements. Once installed, such language tables can support other internationalized programs on the system.

Different cultures and countries have different rules for punctuation, word order, sorting, the order of items and addresses, currency measures and conversions, number formats and other local idiosyncracies. Many native languages and customs have different meanings for certain symbols used as computer icons as well as colors which may be used to indicate some special meaning.

Localization of a computer product from one locale to another to accommodate such differences more specifically involves:

1. Translation of software documentation into the new language;
2. Translation of the textual messages embedded in the software into the new language;
3. Incorporation of additional software facilities to make input and output of the new language and perhaps new characters possible;
4. Adapting the software to accommodate the customs and conventions of the new locale; and
5. Testing and assurance that the modified product works as intended in the new locale.

This process of localization is very labor intensive and requires people who know the native language of the new country as well as the basics of computer program architecture and construction.

FIG. 2 illustrates an internationalized program which has been localized into a plurality of languages. Program 200 has been internationalized, that is, written with the appropriate hooks so that a particular message catalog 210 and a corresponding language table 220 can either be bound to the program 200 at run time or selected by virtue of a software switch. Note that languages such as Korean (220C) and Japanese (220I) require a character set which cannot be represented with a single byte of data. A language table which requires that each character be represented by more than one byte is called a multibyte locale. Typically, a two byte representation or a wide character is utilized for each character in a multi-byte locale. Languages such as French (220A) and German (220B) are single byte languages which have a character set which can be represented in a single 8 bit byte. American English is also a single byte language which can be represented in 7 bits of an 8 bit byte and such a representation is referred to as USASCII.

FIG. 3 illustrates development of an internationalized computer program in the U.S.A. As the internationalized computer program 300 is developed, a catalog of English messages is concurrently developed (310). If a language table or locale 320 which reflects the customs of the locale of development, namely, the United States, has been developed, there is no need to repeat the development. Only USASCII need be supported and the time representations, dates, currency formats, sort order and the like are those in use in the U.S.A. A set of software development tools 340, permit the development, debugging and compiling of the I18N software 300 and the creation of the message catalog 310 and the USASCII English locale 320. In their simplest form, the development tools would include text editor for creating source code, message catalogs and locales, and a compiler.

FIG. 4 illustrates life cycle development and testing of an internationalized computer program developed in the United States. The development of an I18N program, English message catalog in U.S. ASCII English locale (400) proceeds concurrently as shown in FIG. 3. At various stages during development, the program is tested in its native locale (410). If bugs are found, they are corrected in the development phase 400. The local testing step 410 encompasses both informal testing done by the developer and formal testing as the result of a release. There may be several iterations of development testing and changes (400, 410) until the development is considered sufficiently stable to be passed to a localization team for localization to a non-U.S. locale (420). Development of the localized version 420 and testing of the localized version 430 may result in the discovery of software bugs unique to the localization process. These will be corrected by the localization team (420). However, such testing may also reveal problems with the development of the I18N core program itself. Such problems must, therefore, be referred back to the developers for correction (400).

The Problems

The development process outlined above has several deficiencies. First, many software bugs result when attempting to localize an internationalized software program to a multi-byte locale. These are not identified until testing of the localized version and as a result, feedback to developers occurs long after the introduction of the error and after the time and effort has been expended to release the software to a localization team. Such late identification of errors greatly increases the cost of correction of the software.

Further, enhancements of functionality and incorporation of engineering change orders into the software cannot be tested in the multi-byte version until release of the software to the localization team. This, too, increases the cost of development and maintenance of the software. There is thus a need for improving the development and testing process of internationalized software.

SUMMARY OF THE INVENTION

The present invention provides a system, process and computer program product which has the advantage of permitting testing of much of the multi-byte functionality during the development process. This is accomplished by providing a multi-byte locale for a single byte language which would act for testing purposes just like a multi-byte locale for a multibyte language but in which the content was in the single byte language. Thus, an I18N program developer using a single byte language such as English could develop the I18N core program, an English message catalog and utilize a USASCII English locale and then immediately test the development work in a multi-byte English locale which should produce the identical results found in the USASCII English locale represented, however in multi-byte or wide characters. Thus, many of the errors associated with the localization process can be detected early and corrected by the developer prior to release to the localization teams. Further, enhancements to the software and incorporation of engineering change orders can be developed and tested in both the USASCII locale and in a multi-byte English locale, thus identifying and correcting at an early stage those software bugs at much less cost.

The invention is directed to a method of testing internationalized software, by binding internationalized software to be tested to a multibyte locale created for a single byte language. In it's simplest form, this is done by creating a mapping between multibyte binary words and characters of said single byte language; and providing for conversion of representations of characters of said single byte language into corresponding multibyte binary words specified by said mapping. Another form includes providing a sort function which sorts multibyte binary words in a sort order customary for said single byte language, but which differs from a binary sort order; as a result of which, failure to invoke said sort function of the multibyte locale will result in a different sort order from said sort order customary for said single byte language. Yet another for includes defining a date representation for a particular locale; and providing a date function which converts an internationalized date representation to said date representation for a particular locale as a result of which failure to invoke said date function of the multibyte locale will result in a different date representation from said date representation customary for said locale. It is desirable to provide for display of multibyte binary words so as to create a visual distinction between characters represented in said multibyte binary words and characters represented in ASCII. The visual distinction can relate to one of font, color or spacing.

The invention is also directed to apparatus for testing internationalized software, including a computer; and a computer program stored on said computer for use with said internationalized software, said program including a multibyte locale created for a single byte language.

The invention is also directed to a computer system for developing software having at least one computer; one or more message sources, each containing one or more program messages in a single byte language; and one or more language tables containing specific processing information and conventions for a particular locale, at least one of which is a multibyte locale created for a single byte language.

The invention is also directed to a computer system for developing and testing an internationalized computer program written in a single byte language including a network, one or more computers connected to the network; a source of messages to be used by said internationalized computer program when running on said one or more computers; and one or more locales, each containing specific processing information and conventions for a particular location, at least one of which is a multibyte locale created for said single byte language, for binding to said internationalized computer program during program development and testing, by which an internationalized computer program under development can be tested.

The invention is also directed to a product for implementing a multibyte locale on a computer readable memory medium by including a data structure stored on said memory medium, utilized for controlling the multibyte locale, said data structure having a mapping of characters of a single byte language to corresponding multibyte binary words, a mapping of elements of a date representation utilized with internationalized software to elements of a date representation of a particular locale or a representation of sort order utilized in a particular locale.

The invention is also directed to a computer program product for implementing a multibyte locale including a computer readable memory medium; and one or more language tables containing specific processing information and conventions for a particular locale, at least one of which is a multibyte locale created for a single byte language.

The invention is also directed to a computer program product for implementing a multibyte locale in a single byte language comprising a computer readable memory medium; and a computer program including a routine for conversion of representations of characters of said single byte language into corresponding multibyte binary words, a routine providing a sort function which sorts multibyte binary words in a sort order customary for said single byte language, but which differs from a binary sort order; and a routine for providing a date function which converts an internationalized date representation to said date representation for a particular locale.

The invention is also directed to a network with improved capabilities for testing internationalized software, which has a plurality of computers connected to the network and at least one of said computers configured to bind an internationalized program written in a single byte language to a multibyte locale created for said single byte language.

The invention is also directed to a method of testing internationalized software written in a single byte language using a network by downloading, over said network, a multibyte locale implemented in said single byte language; and binding said multibyte locale to said internationalized software for testing.

The invention is also directed to a method of facilitating testing of internationalized software written in a single byte language at a remote location using a network by sending, over said network, a multibyte locale created for said single byte language to a computer at said remote location, as a result of which said computer at said remote location can bind the multibyte locale created for said single byte language to said internationalized software for testing.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
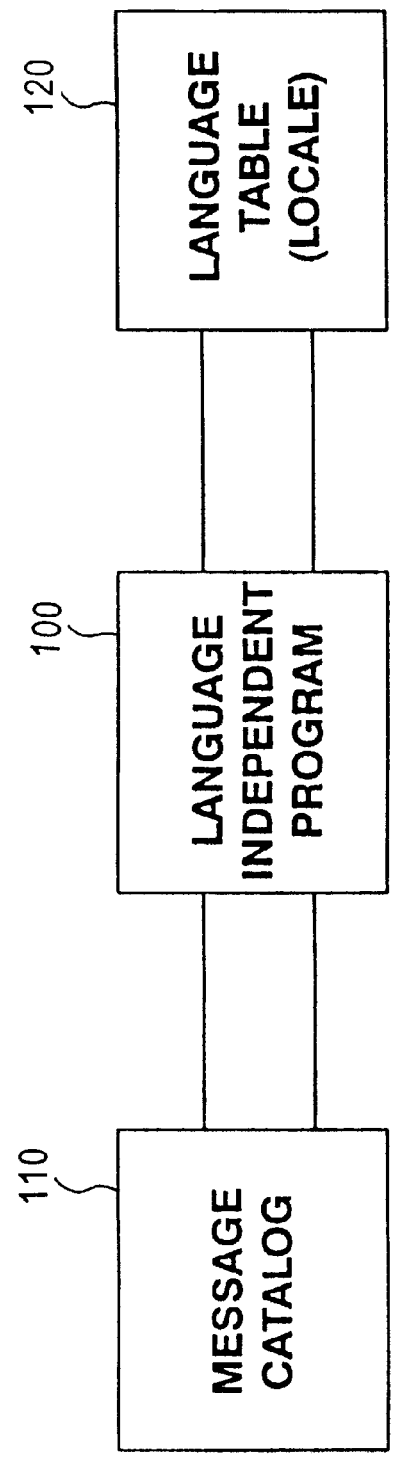
FIG. 1 illustrates a model of internationalized software.
Figure 2:
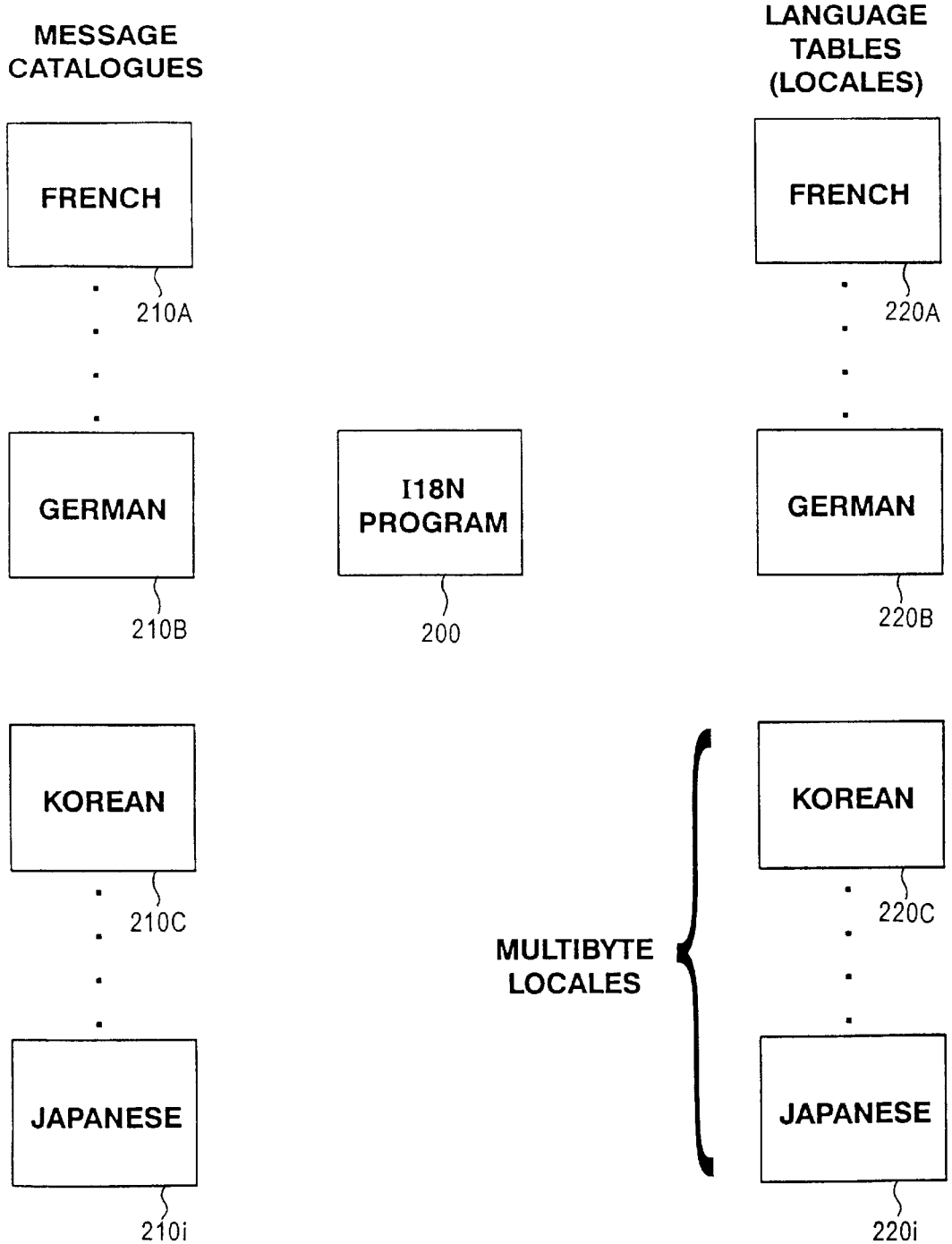
FIG. 2 illustrates an internationalized program which has been localized into a plurality of languages.
Figure 3:
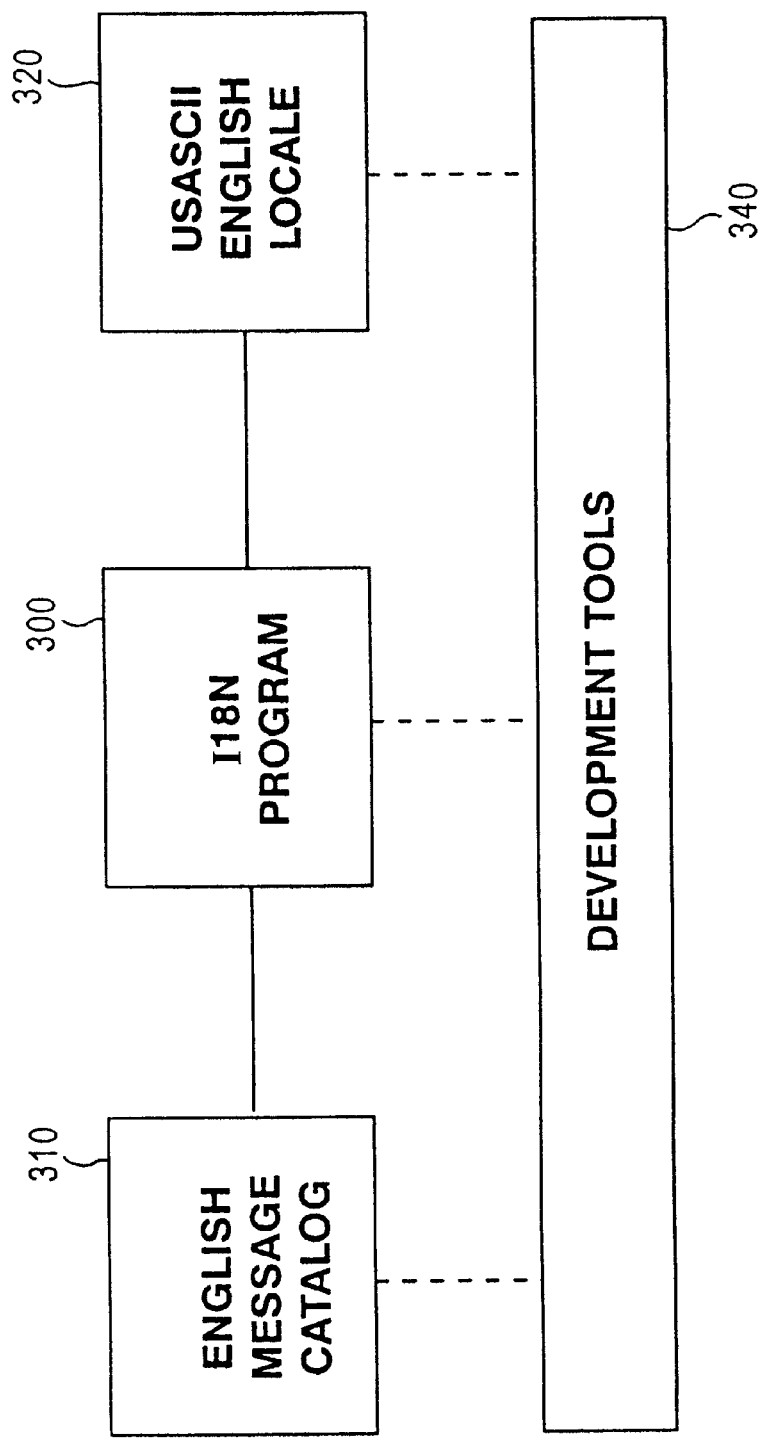
FIG. 3 illustrates development of an internationalized computer program in the United States of America.
Figure 4:
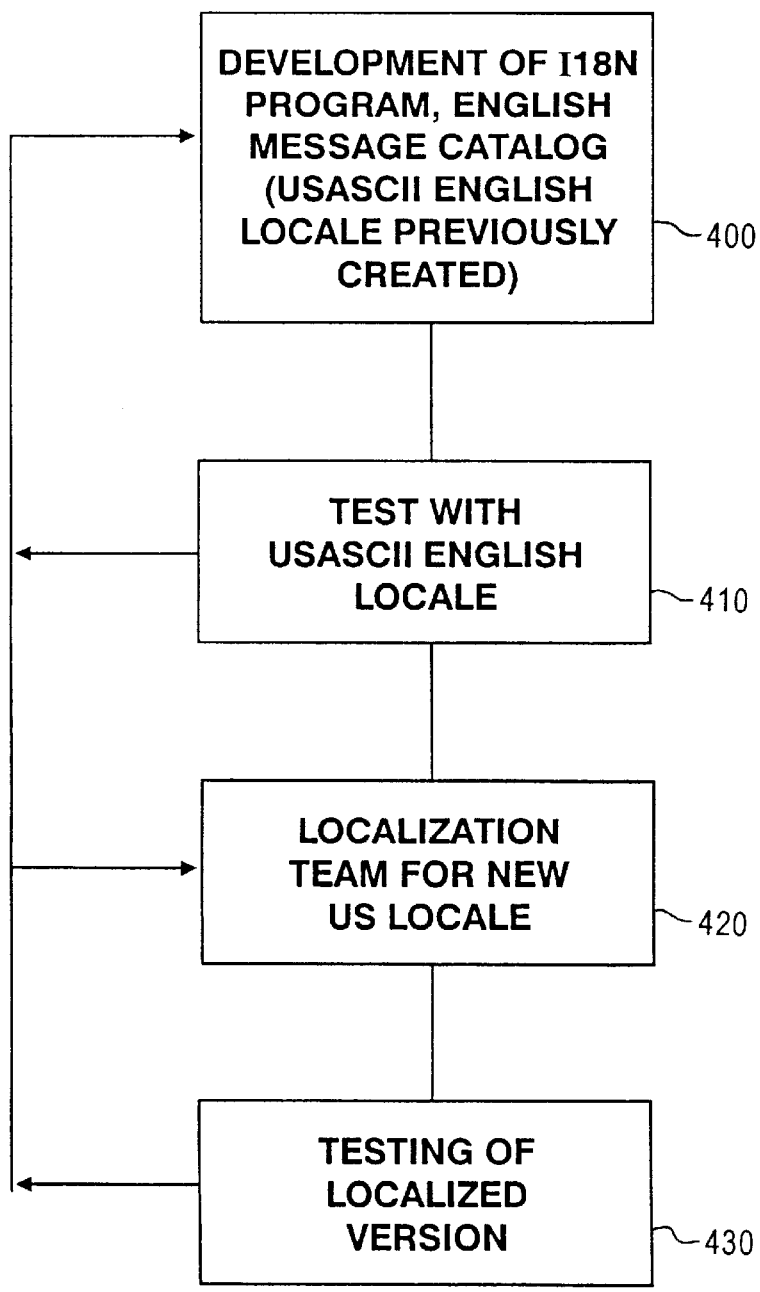
FIG. 4 illustrates life cycle development and testing of an internationalized computer program developed in the United States.
Figure 5:
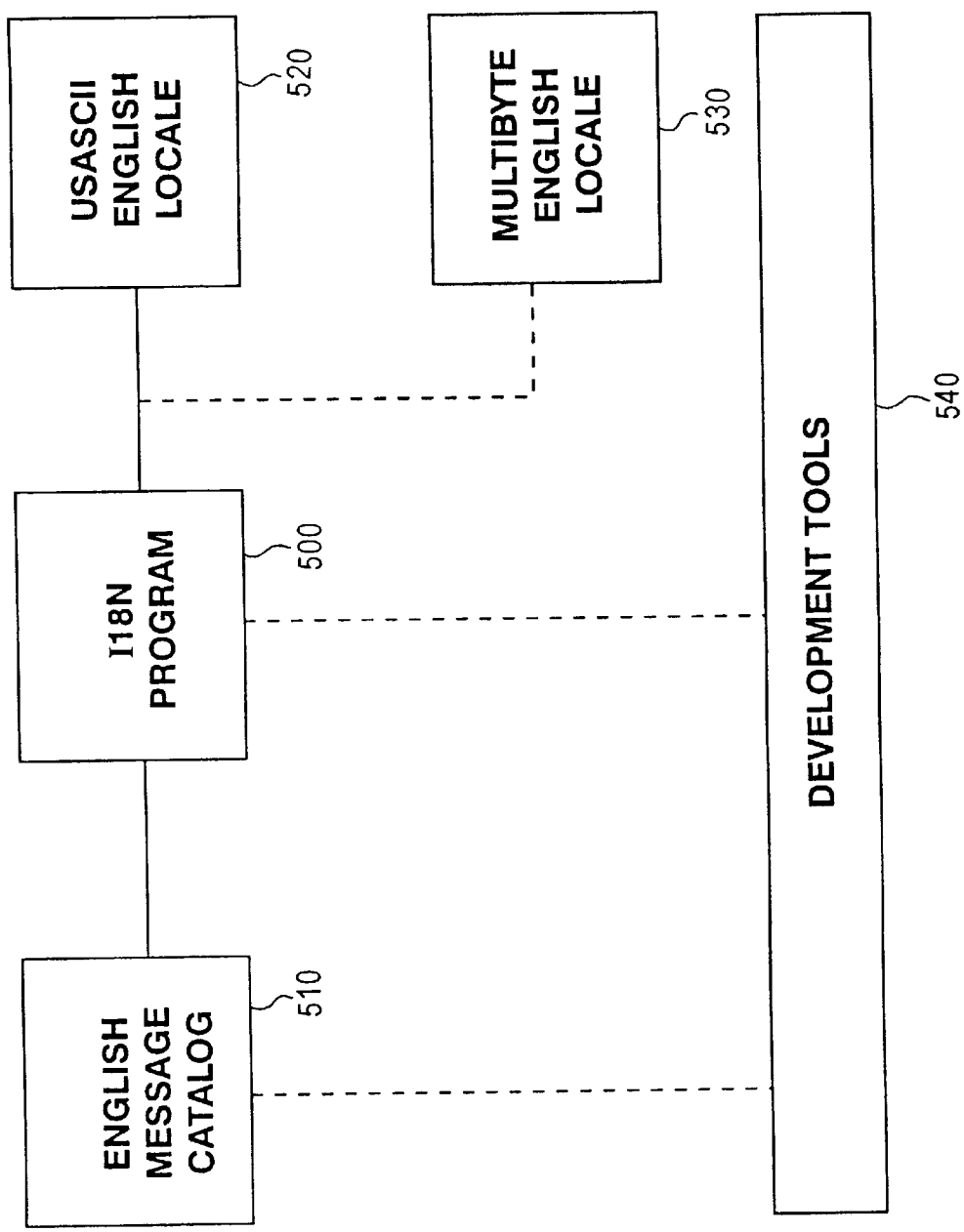
FIG. 5 illustrates an exemplary development environment containing a multi-byte locale for a single byte language in accordance with the invention.

FIG. 5 illustrates a development environment containing a multi-byte locale for a single byte language in accordance with the invention. Blocks 500, 510, 520 and 540 correspond to blocks 300, 310, 320 and 340 of FIG. 3. The inventors have recognized the fact that the capability of developing software for international deployment can be greatly enhanced by inclusion in the development environment of a multi-byte locale 530 for a single byte language. This example permits the I18N core program to be run not only in a USASCII English locale (520) but also in a multi-byte English locale, 530. This permits immediate testing of much of the multi-byte functionality during the development of the program on a selective basis. This enables a developer to identify problems very quickly and to correct them immediately, rather than waiting for completion of localization development and testing.

Figure 6:
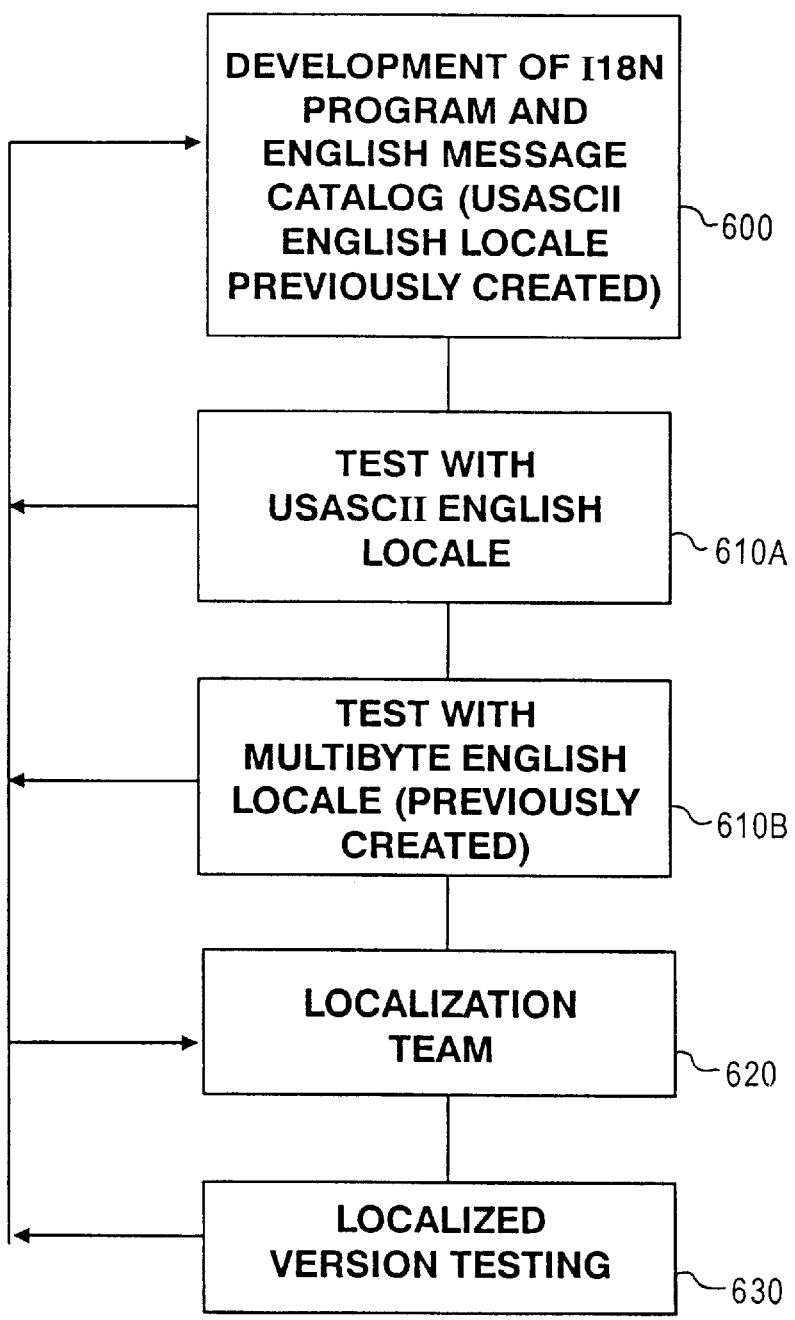
FIG. 6 illustrates an improved test method in accordance with the invention.

FIG. 6 illustrates a revised testing process used when a multi-byte locale for a single byte language is available for testing.

FIG. 6 assumes that a standard USASCII English locale has been previously developed. The requirements for locales have been set forth more in detail above. FIG. 6 also assumes that a multi-byte English locale has been previously created. This could be as simple as modifying a U.S. ASCII English locale to accommodate multi-byte or wide characters. However, certain enhancements are preferred in the implementation of the multibyte locale for a single byte language. When creating a multibyte locale for a single byte language, it is desirable to build in features which permit ready identification of errors when invoking operations within the multibyte locale. One such technique involves creating a visual distinction between a display of regular ASCII characters and a display of a multibyte character. Such a visual distinction could occur in either font, color, or character spacing. Thus, when an ASCII character is displayed without properly invoking the multibyte functions, it would be displayed in normal ASCII mode without the visual distinctions which would be expected had the multibyte locale function been properly invoked.

Similarly, it is desirable to have a special sorting routine for the multibyte locale which sorts in an order different from the normal binary sort order so that if sorting occurs by some medium other than a sort routine of the multibyte locale, the resulting sort order would be noticeably improper. For example, if sorting occurred by a binary sort routine, the order could be reversed from the normal sort routine provided by the multibyte locale, to indicate that the sort mechanism of the multibyte locale had not been properly invoked. If the sort routine of the multibyte locale had been properly invoked, then sorting would occur in the expected order.

The same type of approach can be taken with dates so that when the date routine of the multibyte locale is properly invoked, the date presentation is correct for the locale, whereas if it is not, the date presentation would be recognizably different.

As shown in FIG. 6, during development of an I18N program and its associated English message catalog, at various times the product developed will be tested using the USASCII English locale (610A). If bugs are found, the developer can correct them immediately (600) and then retest (610A) to see if the software operates satisfactorily. If it does, the developer then may wish to test using a multi-byte English locale (610B) to identify problems with the I18N core program which might not handle the multi-byte representations properly. Typically, many such problems are found in the display and printing routines. Using the multi-byte English locale, the developer can immediately test for these problems and correct them before the software is released to the localization team (620) and before localized version testing (630).

In this manner, a great many more software bugs are identified early in the development process where they can be corrected with considerably less cost and without the extra work associated with release to a localization team. The existence of a multi-byte locale for a single byte language for testing is particularly advantageous when localization in a number of countries proceeds concurrently. In those countries requiring multi-byte representations, each localization team would discover the same errors during testing and the costs of identifying those errors would multiply in accordance with the number of teams working concurrently. By allowing the developer to test in a multi-byte locale directly, the developer can test the multi-byte capabilities and still have the test results presented in the single byte language used for development.

Figure 7A:
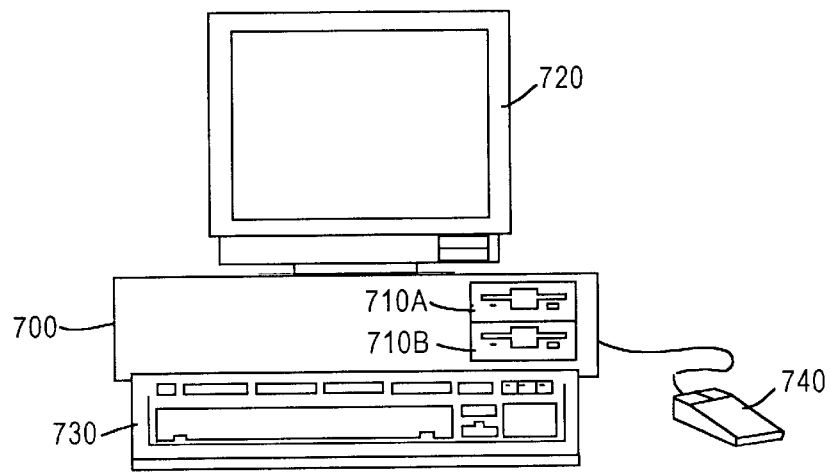
FIG. 7A illustrates a computer of a type suitable for carrying out the invention.

FIG. 7A illustrates a computer of a type suitable for carrying out the invention. Viewed externally in FIG. 7A, a computer system has a central processing unit 700 having disk drives 710A and 710B. Disk drive indications 710A and 710B are merely symbolic of a number of disk drives which might be accommodated by the computer system. Typically, these would include a floppy disk drive such as 710A, a hard disk drive (not shown externally) and a CD ROM drive indicated by slot 710B. The number and type of drives varies, typically, with different computer configurations. The computer has the display 720 upon which information is displayed. A keyboard 730 and a mouse 740 are typically also available as input devices over interface 745. Preferably, the computer illustrated in FIG. 7A is a SPARC workstation from Sun Microsystems, Inc.

Figure 7B:
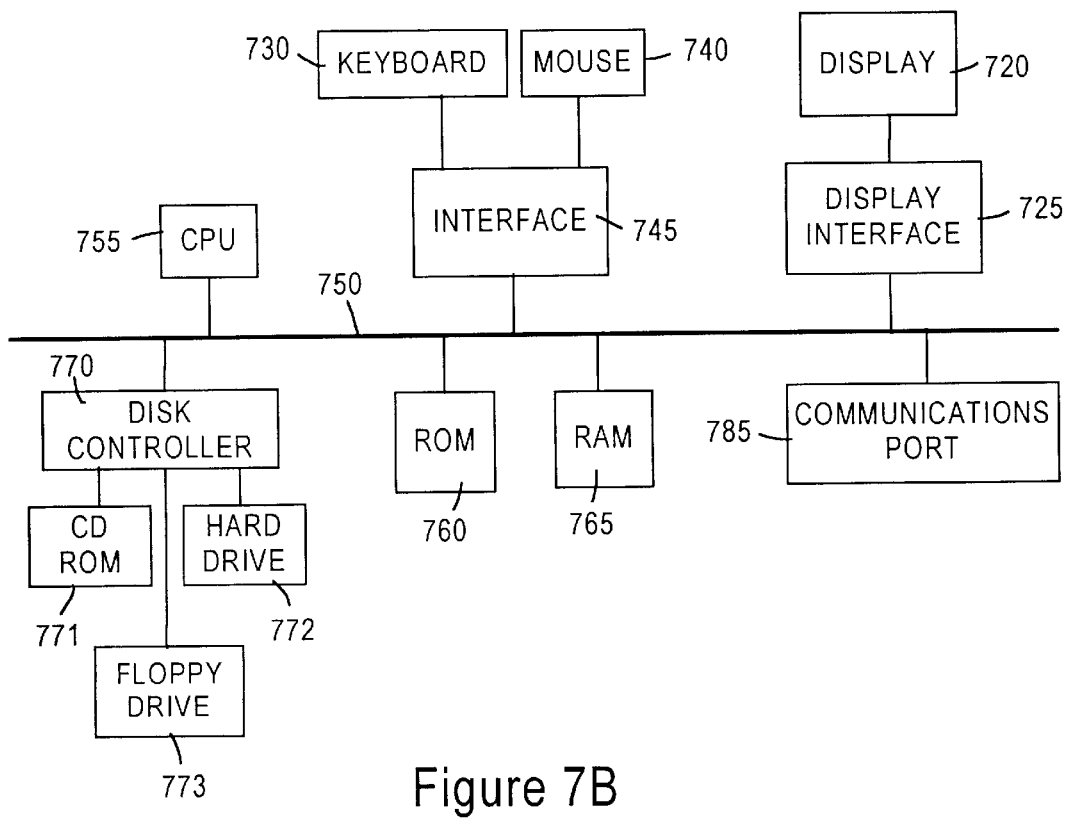
FIG. 7B illustrates a block diagram of the computer of FIG. 7A.

FIG. 7B illustrates a block diagram of the internal hardware of the computer of FIG. 7A. A bus 750 serves as the main information highway interconnecting the other components of the computer. CPU 755 is the central processing unit of the system, performing calculations and logic operations required to execute a program. Read only memory (760) and random access memory (765) constitute the main memory of the computer. Disk controller 770 interfaces one or more disk drives to the system bus 750. These disk drives may be floppy disk drives, such as 773, internal or external hard drives, such as 772, or CD ROM or DVD (Digital Video Disks) drives such as 771. A display interface 775 interfaces display 720 and permits information from the bus to be displayed on the display. Communications with external devices can occur over communications port 785.

Figure 7C:
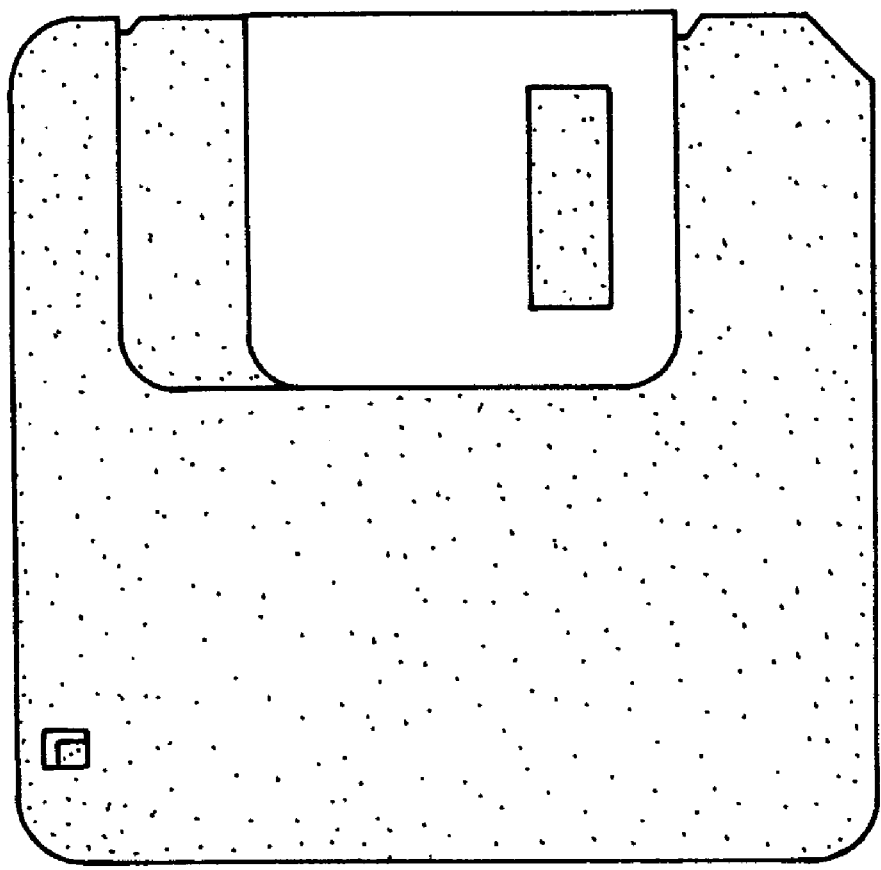
FIG. 7C illustrates a floppy disk containing a program usable with the computer of FIG. 7A.

FIG. 7C illustrates an exemplary memory medium which can be used with drives such as 773 in FIG. 7B or 710A in FIG. 7A. Typically, memory media such as a floppy disk, or a CD ROM, or a Digital Video Disk will contain, inter alia, a multi-byte locale for a single byte language and the program information for controlling the computer to enable the computer to perform its testing and development functions in accordance with the invention.

Thus, using the techniques of the invention disclosed herein, internationalized software can be developed and tested at much lower cost and with greater efficiency than was heretofore possible.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A computer implemented method of testing internationalized software, comprising the step of:
   a. providing an element for performing the step of binding internationalized software to be tested to a multibyte locale created for a single byte language.

2. Apparatus for testing internationalized software, comprising:
   a. a computer; and
   b. a computer program stored on said computer for use with said internationalized software, said program comprising a multibyte locale created for a single byte language.

3. A computer system for developing software comprising:
   a. at least one computer;
   b. one or more message sources, each containing one or more program messages in a single byte language; and
   c. one or more language tables containing specific processing information and conventions for a particular locale, at least one of which is a multibyte locale created for a single byte language.

4. A computer system for developing and testing an internationalized computer program written in a single byte language, comprising:
   a. a network;
   b. one or more computers connected to said network;
   c. a source of messages to be used by said internationalized computer program when running on said one or more computers; and
   d. one or more locales, each containing specific processing information and conventions for a particular locale, at least one of which is a multibyte locale created for said single byte language, for binding to said internationalized computer program during program development and testing,
   whereby an internationalized computer program under development can be tested using said multibyte locale.

5. A network with improved capabilities for testing internationalized software, comprising;
   a plurality of computers connected to the network;
   at least one of said computers configured to bind an internationalized program written in a single byte language to a multibyte locale created for said single byte language.

6. A method of testing internationalized software written in a single byte language using a network comprising the steps of:
   providing an element for performing the step of downloading, over said network, a multibyte locale implemented in said single byte language; and
   providing an element for performing the step of binding said multibyte locale to said internationalized software for testing.

7. A method of facilitating testing of internationalized software written in a single byte language at a remote location using a network comprising the steps of:
   providing an element for performing the step of sending, over said network, a multibyte locale created for said single byte language to a computer at said remote location,
   whereby said computer at said remote location can bind said multibyte locale created for said single byte language to said internationalized software for testing.

\* \* \* \* \*